US012641138B2

(12) United States Patent
Hourihane

(10) Patent No.: US 12,641,138 B2
(45) Date of Patent: May 26, 2026

(54) DYNAMIC ENCODING METHOD MODIFICATION FOR OPTIMIZING CLIENT PERFORMANCE

(71) Applicant: Omnissa, LLC, Mountain View, CA (US)

(72) Inventor: Alan Hourihane, Deganwy (GB)

(73) Assignee: Omnissa, LLC, Mountain View, CA (US)

( * ) Notice: Subject to any disclaimer, the term of this patent is extended or adjusted under 35 U.S.C. 154(b) by 186 days.

(21) Appl. No.: 18/153,152

(22) Filed: Jan. 11, 2023

(65) Prior Publication Data

US 2024/0236167 A1     Jul. 11, 2024

(51) Int. Cl.
*H04L 65/756*          (2022.01)

(52) U.S. Cl.
CPC .................................. *H04L 65/756* (2022.05)

(58) Field of Classification Search
CPC ...... H04L 65/756; H04L 65/762; H04L 65/75
See application file for complete search history.

(56) References Cited

U.S. PATENT DOCUMENTS

| | | | | |
|---|---|---|---|---|
| 11,700,402 B1 * | 7/2023 | Dimitrov | ................ | H04L 47/30 |
| | | | | 725/144 |
| 2010/0166062 A1 * | 7/2010 | Perlman | ............... | H04N 21/658 |
| | | | | 382/239 |
| 2018/0349283 A1 * | 12/2018 | Bhatia | .................. | H04N 21/431 |
| 2022/0193540 A1 * | 6/2022 | Sun | ...................... | A63F 13/5258 |
| 2023/0197037 A1 * | 6/2023 | Ranka | ...................... | G09G 5/12 |
| | | | | 345/520 |
| 2023/0275950 A1 * | 8/2023 | Sundareson | .......... | H04L 65/765 |
| | | | | 709/219 |

* cited by examiner

*Primary Examiner* — Schquita D Goodwin
*Assistant Examiner* — Mehulkumar J Shah
(74) *Attorney, Agent, or Firm* — Kim & Stewart LLP

(57)          ABSTRACT

Systems and methods are described for providing ways to optimize client performance during screen data streaming. Periods of time a client takes to render frames can be tracked and the frame rendering times can be analyzed to determine when the client performance is insufficient. If the client rendering performance is determined to be insufficient, the encoding method can be dynamically modified in ways preferable for improving the client rendering performance. Different approaches can be utilized for calculating metrics and determining when to modify the encoding method, such as linear interpolation or by taking averages of frame rendering times in a moving sample window.

15 Claims, 4 Drawing Sheets

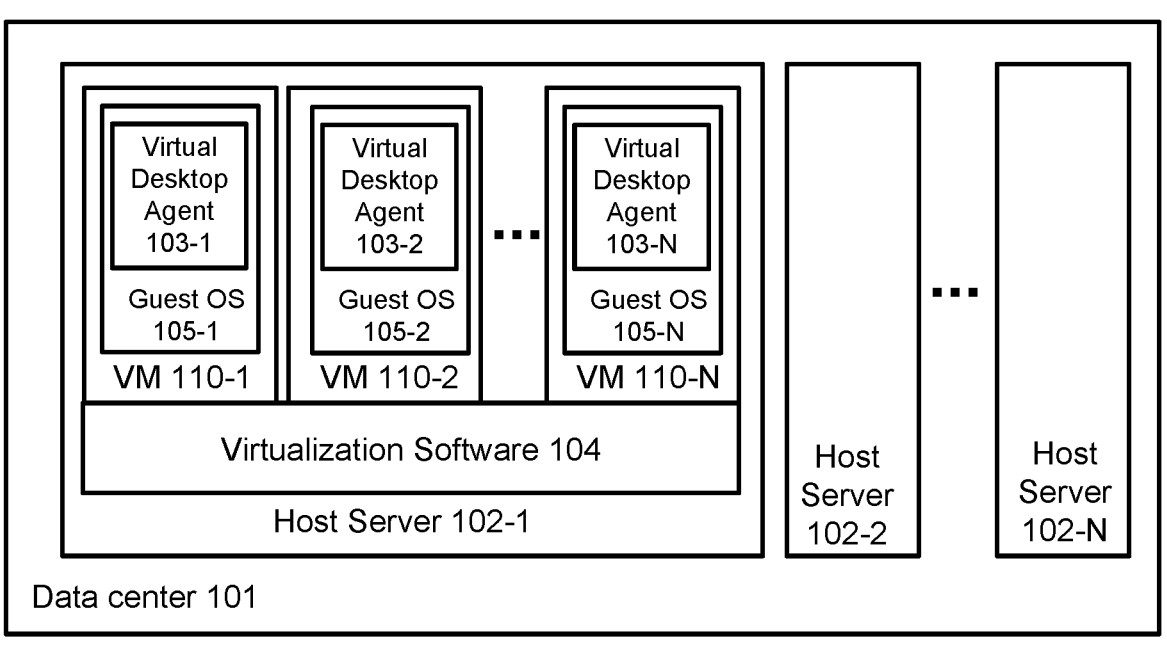
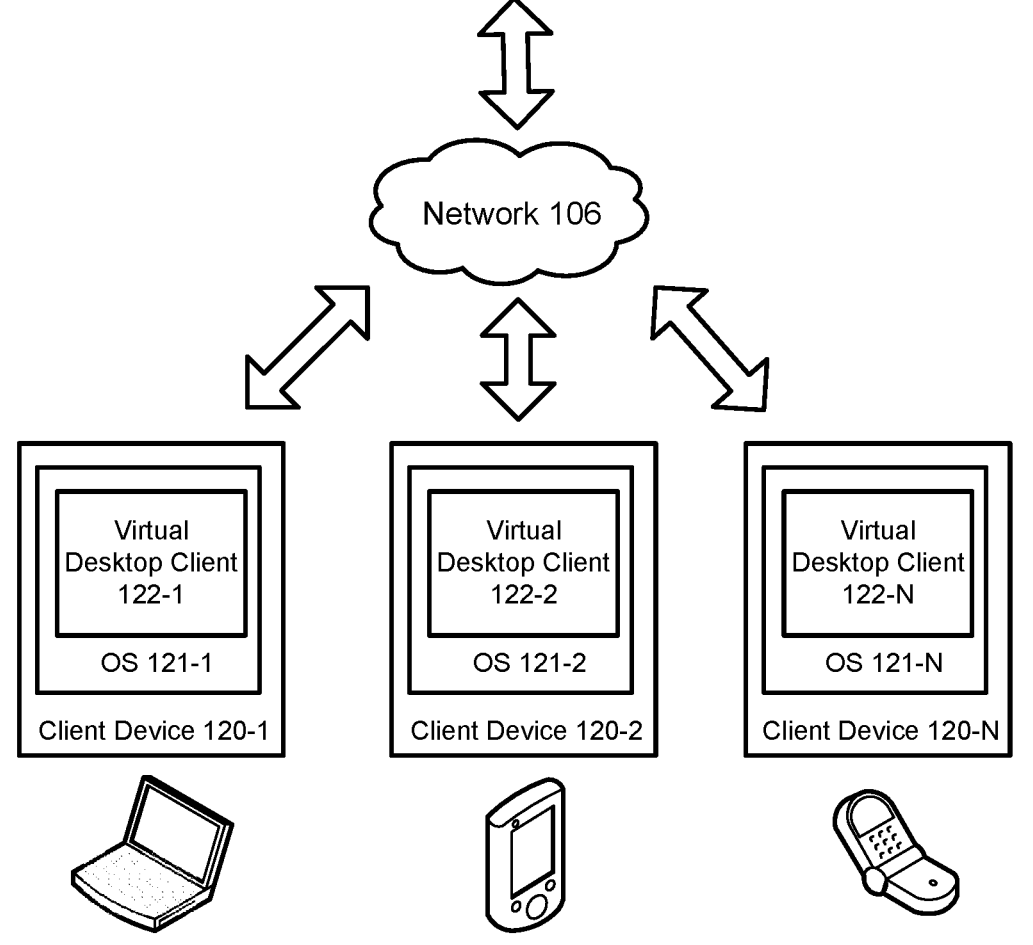
FIG. 1

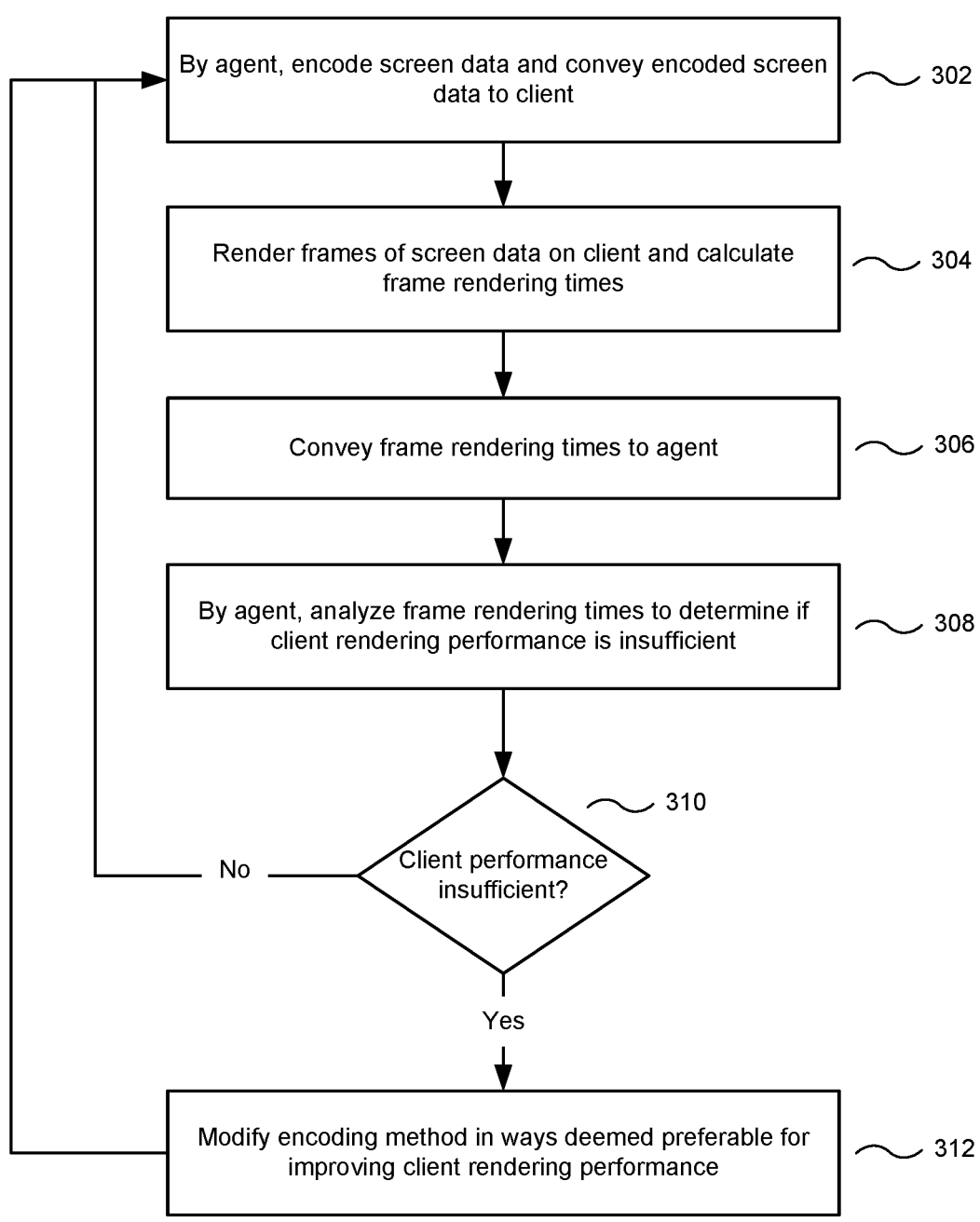

By agent, encode screen data and convey encoded screen data to client — 302

Render frames of screen data on client and calculate frame rendering times — 304

Convey frame rendering times to agent — 306

By agent, analyze frame rendering times to determine if client rendering performance is insufficient — 308

310

Client performance insufficient?

No

Yes

Modify encoding method in ways deemed preferable for improving client rendering performance — 312

FIG. 3

DYNAMIC ENCODING METHOD MODIFICATION FOR OPTIMIZING CLIENT PERFORMANCE

TECHNICAL FIELD

The present disclosure generally relates to streaming screen data to a client and more specifically to techniques for efficient encoding and decoding of screen data streamed to a client to optimize performance.

BACKGROUND OF THE INVENTION

In various streaming technologies, screen data such as frames of a video or a graphical user interface (GUI) of an application or desktop is sent as a stream of pixel data to a client device at the location of a user. For example, when a user accesses a remote desktop or a remote application on a client device, the GUI of the desktop or the application is captured on the server and streamed to the client device to be displayed to the user. Similarly, when a user is watching a video that is streamed from a server, video pixel data is conveyed from the server and displayed on the user's client device. In each case, the pixel data is encoded at the server and conveyed to the client device over a network connection.

On the client device, the received pixel data is decoded to render frames that are displayed to the user, producing the content (video, GUI, etc.). Generally, frames are sent from the server to be rendered on the client and displayed at a determined frame rate. However, in some cases the client may not be able to render the frames sufficiently quickly to present them at the specified frame rate. For example, this may be the case if the client device lacks sufficient computing resources (CPU, GPU, etc.) to decode the frames at the required rate. As a result, frames may be dropped from the stream and the user experience can degrade, while network resources are also wasted in delivering screen data that cannot be displayed due to the deficiency on the client and is discarded.

In addition, various implementations cannot tolerate delays and therefore cannot take advantage of mechanisms such as buffering, etc. For example, when a user accesses a virtual desktop or application, the streamed GUI cannot be delayed without significantly degrading user experience (e.g., because the GUI needs to be responsive to user inputs). In other applications, such as video conferencing, live events broadcasts, etc., video streams must likewise be presented without delay to achieve a suitable user experience. What is needed is a more efficient approach for optimizing client performance for screen data streaming.

BRIEF DESCRIPTION OF DRAWINGS

FIG. 1 illustrates an example of a virtual desktop environment, in accordance with various embodiments.

FIG. 3 illustrates an example process flow for optimizing client performance for screen data streaming, in accordance with various embodiments.

DETAILED DESCRIPTION OF THE INVENTION

Figure 2:
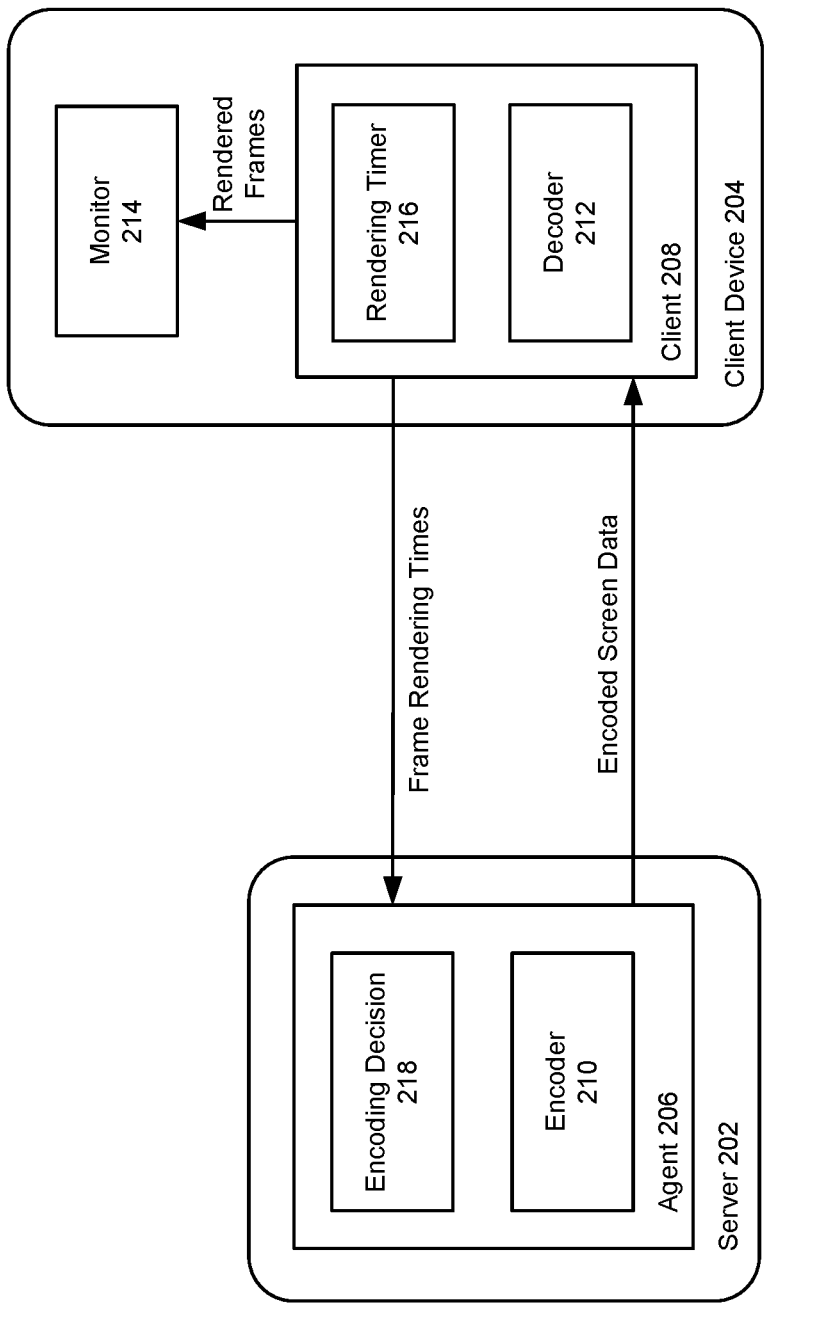
FIG. 2 illustrates an example architecture of a system for optimizing client performance for screen data streaming, in accordance with various embodiments.

Systems and methods in accordance with various embodiments of the present disclosure overcome at least some of the above-mentioned shortcomings and deficiencies by providing more efficient ways for optimizing client performance for screen data streaming. In particular, embodiments described herein leverage a mechanism for tracking how long a client takes to render frames, analyzing the frame-rendering times to determine when the client performance is insufficient, and dynamically modifying the encoding method in ways preferable for improving the client rendering performance.

Different approaches can be utilized for calculating metrics and determining when to modify the encoding method based on frame rendering times, such as linear interpolation or by taking averages of frame rendering times (e.g., in a moving sample window). When such a calculated metric breaches a threshold value, the encoding method can be modified or adjusted to improve client rendering performance.

The techniques can be implemented in various environments where encoded screen data is conveyed from a server to a client and can be particularly advantageous in virtual desktop infrastructure (VDI) environments and other implementations where delays are not tolerated.

The process can begin by encoding screen data on a server and conveying the encoded screen data in a data stream to the client device over a network connection. The data stream can correspond to a graphical user interface (GUI) of a virtual desktop executing on the server or to any other types of screen data or video that is streamed from the server to be displayed on a monitor of the client device.

On the client device, the encoded screen data can be received and frames can be rendered from the data stream. For example, the frames can be rendered by decoding the data stream and preparing frames to be displayed on the client device monitor. During the frame rendering process, the amount of time spent to render individual frames can be tracked. For example, the client device can time how long it takes to render each frame in the data stream. The rendering times of the frames can then be used to determine if the client device rendering performance is sufficient or insufficient.

In various embodiments, the client device can send the measured frame rendering times to the server, and the server can analyze the data to determine if the client's rendering performance is insufficient, such as by comparing the frame rendering times to a target frame rendering time. Different approaches and metrics can be implemented, such as averaging frame rendering times in a moving sample window. If it is determined that client rendering performance is insufficient, the encoding method can be modified to a method that is deemed preferable for improving the client device rendering performance, such as by changing encoding parameters, switching encoders, and so on. For example, if the client rendering performance is determined to be insufficient, the server may switch to using a different codec to encode the screen data that allows the screen data to be decoded faster or requires fewer resources on the client. Alternatively, various parameters of the encoding method may be modified to improve client rendering performance, such as by decreasing quality, resolution, or other parameters. The process can then continue to track the frame rendering times on the client and analyzing the data to determine if the client rendering performance is sufficient with the modified encoding method. If the rendering performance is again determined to be insufficient, the encoding method can be modified further to improve performance. As a result, better user experience and improved utilization of network and computing resources can be achieved.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

FIG. 2 illustrates an example architecture of a system for optimizing client performance for screen data streaming, in accordance with various embodiments. As illustrated in the example of FIG. 2, a server 202, which can physically reside in a data center, can be communicatively linked to a client device 204 via a network. The client device 204 can be a personal computer, laptop, smartphone, tablet, or any other applicable computing device that may be used by a user for consuming screen data. An agent 206 running on the server 202 can communicate with a client 208 running on the client device 204 for conveying the screen data. In various embodiments, the agent 206 can send encoded screen data to the client 208 and the client 208 can process the data for displaying it on a monitor 214, which may be an integrated or an external monitor of the client device 204.

In various embodiments, the agent 206 can be a virtual desktop agent running in a virtual desktop on the server 202, as described above in the example of FIG. 1. The client 208 can be a virtual desktop client running on the client device 204, enabling a user of the client device to 204 to access and interact with the virtual desktop executing on the server, as also further described in the example of FIG. 1 above. During the virtual desktop session, the agent 206 (virtual desktop agent) can capture the GUI of the virtual desktop on the server and convey it to the client 208 (virtual desktop client) as a data stream of encoded screen data, as illustrated in the example of FIG. 2. The client 208 can decode and process the received encoded screen data to generate frames that can be displayed on the monitor 214, producing the virtual desktop GUI on the monitor 214.

In other embodiments, the system can be implemented in different environments (other than VDI). For example, the agent 206 can be any kind of application configured for sending screen data to the remote client device 204, and the client 208 can be an application configured for rendering the screen data and displaying it to the user of the client device 204 on the monitor 214. For example, the agent 206 and client 208 can be part of various products that implement screen data or video streaming, such as teleconferencing software, remote application access, remote computer access software, video streaming services, etc.

In various embodiments, an encoder 210 can operate on the agent 206 for encoding the screen data, which can be a hardware or software encoder, before the screen data is conveyed to the client 208. Some examples of encoders that might be used are H.264, JPG/PNG, H.265, MPEG-2, MPEG-4, among others. Generally, the encoded screen data can contain sequential frame data that has been encoded to facilitate transmission of the data. The encoded screen data can be received on the client device 204, decoded by a decoder 212, which can be a hardware or software decoder, and processed as necessary to render frames. Once a frame is rendered, it can be passed to and displayed on the monitor 214. For example, once a frame is rendered, the operating system (OS) of the client device 204 can be called to display the frame on the monitor 214, e.g., the client 208 can make such a call to the client device 204 OS.

In various embodiments, the client 208 can contain a rendering timer module 216, which can measure the rendering time of individual frames (the amount of time it takes to render individual frames from the encoded screen data). As sequential frames are rendered by the client 208 (e.g., utilizing the decoder 212) from the received encoded screen data, the rendering timer 216 can calculate or measure the rendering time of individual frames, e.g., of each received frame. In various embodiments, the rendering time of a frame can be the period from the point in time when data of the frame is received to the point in time when the frame is sent to or is ready to be sent to the monitor 214 for displaying.

In various embodiments, to measure the rendering time for a frame, the rendering timer 216 can determine a time when the frame's rendering process is considered to have started, and a time when the frame's rendering process is considered to have finished (when the frame is considered to be rendered). The rendering time for the frame can then be calculated as the period from the start time to the finish time (or the difference between the finish time and the start time). For example, a frame rendering start time may be the time when data for the frame is received at the client 208 or at the client device 204, or when the rendering or decoding process for the frame begins. In various embodiments, the frame rendering finish time may be the time when the frame is sent to the monitor 214 of the client device to be displayed. In various embodiments, the frame rendering finish time may be the time when a request is sent to the operating system of the client device 204 to display the frame on the monitor 214 (e.g., the OS is called to display the frame on the monitor 214); or the time when the frame is sent to the operating system on the client device 204 to be displayed on the monitor 214; or the time when the frame is ready to be sent to the monitor 214 of the client device 204 to be displayed.

In various embodiments, the calculated frame rendering times of individual frames can be conveyed to the agent 206 and forwarded to an encoding decision module 218 in the agent 206. For example, the frame rendering times can be conveyed one by one to the agent 206 as they are calculated on the client 208, or the rendering times can be conveyed as sets of data. The encoding decision module 218 can then analyze the frame rendering times and determine whether the rendering performance of the client 208 or client device 204 is sufficient based on the rendering times. As will be described in further detail below, the encoding decision module 218 can implement different models, metrics, and comparisons of target frame rendering times to make the performance determinations.

If the decision module 218 determines based on the frame rendering times that the client device 204 rendering performance is insufficient, the decision module 218 can modify the encoding method used by the encoder 210 in a way deemed preferable for improving the client device 204 rendering performance. Then, subsequent screen data conveyed to the client 208 can be encoded using the modified encoding method and the process of monitoring the client's 208 rendering performance can resume. That is, frame rendering times can be calculated by the rendering timer 216 and conveyed to the encoding decision module 218 to determine if the client rendering performance, now with the modified encoding method, is sufficient or insufficient. If the performance is found to be insufficient, then the encoding decision module 218 can again change the encoding method to improve client rendering performance further.

In various environments, the encoding decision module 218 can contain various logic or rules indicating how the encoding method should be changed when client 208 rendering performance is determined to be insufficient. Such rules can indicate how certain parameters of the encoding should be changed to improve client rendering performance, and/or when an encoder should be changed to another encoder.

Different approaches can be implemented for modifying the encoding method in ways deemed preferable for improving the client device rendering performance. To modify encoder behavior, for example, certain parameters of the encoder can be changed or the encoder can be switched out with another encoder. For example, to modify the encoding method for improving client performance, the encoding method can be modified in a way that requires less resources or processing capacity on the client for performing decoding. Such a modification can reduce the quality (e.g., reduce resolution) to reduce client-side processing requirements and improve client rendering performance, for example. As will be appreciated by those skilled in the art, different encoding techniques can be utilized in various embodiments and the invention is not limited to any particular encoding technique. As will further be appreciated by those skilled in the art, different ways of modifying and switching encoding methods to reduce processing requirements on the client can be utilized and the invention is not limited to any particular approach.

The encoding decision module 218 can use various techniques to determine when the client rendering performance is insufficient based on received frame rendering times from the client 208. In various embodiments, the techniques can utilize or be based on a target frame rendering time. Such a target frame rendering time can correspond to a threshold maximum permissible or desirable rendering time of frames on the client 208.

In various embodiments, the target frame rendering time can be based on the frame rate of the screen data being conveyed to the client device 204, or on the refresh rate of the monitor 214. For example, the target frame rendering time can be a threshold maximum frame rendering time necessary to achieve a particular frame rate that can be, for example, the frame rate at which the agent 206 sends the frames, or the refresh rate of the monitor 214.

For example, if the agent 206 sends frames in the encoded screen data at a rate of 30 frames per second, then the client may need to render each frame in no more than 33.3 ms (1,000 ms/30 frames=33.3 ms/frame) to be able to display the conveyed frames at the 30 frame per second rate. In this case, 33.3 ms can be set as the target frame rendering time. In an embodiment, the target frame rendering time can be determined based on the monitor 214 refresh rate. For example, if the monitor refresh rate is 60 Hz, the client would need to render each frame in less than 16.6 ms (1,000 ms/60=16.6 ms) to be able to display the frames at the 60 Hz monitor refresh rate. Accordingly, 16.6 ms can be set as the target frame rendering time.

Thus, in various embodiments, the encoding decision module 218 can obtain the frame rate of the screen data that is streamed by the agent 206 to the client 208 and determine the target rendering rate based on the obtained frame rate, as described above.

In various embodiments, the encoding decision module 218 can obtain the monitor 214 refresh rate and determine the target rendering rate based on the obtained monitor 214 refresh rate, as described above. In this case, for example, the client 208 can retrieve and communicate the monitor 214 refresh rate to the encoding decision module 218.

In other embodiments, the target rendering rate may be determined in other ways or it may be predefined, e.g., by an administrator.

After the target rendering rate is determined, the decision module 218 can assess whether the client device rendering performance is insufficient based on the target rendering rate. For example, if the client can render frames faster than the threshold target rendering time (e.g., if frame rendering times received from the client 208 are below the target rendering time), then no modification of encoding may be needed. If, on the other hand, the threshold is exceeded (e.g., if a frame rendering time received from the client 208 is above the target rendering time), then a determination may be made (by the decision module 218) to modify the encoding method in a way deemed preferable for improving the client device rendering performance (e.g., to make the decoding process less demanding of resources on the client device 204). Hence, when the encoding decision module 218 receives frame rendering times from the client 208, it can compare the frame rendering times with the target frame rendering time. Then, if a received frame rendering time exceeds the target rendering time, the encoding decision module 218 can determine that the client rendering performance is insufficient and trigger an encoding method modification.

In various embodiments, different metrics and "smoothing" techniques can be utilized by the encoding decision module 218 for determining when to modify the encoding method. For example, if the encoding decision module 218 modifies the encoding method after a single frame exceeds the target rendering time, it can result in excessive or erratic encoding switching. Such issues can be avoided by using certain metrics or "smoothing techniques" by the encoding decision module 218. In such techniques, for example, instead of looking at individual frame rendering times to make a determination to modify the encoding method, the decision module 218 can look at a set of rendering times and make the decision based on the set. For example, the encoding decision module 218 can analyze rendering time data in a moving sample window. The sample window can be a moving time window, such as the preceding 10 seconds of frame rendering data, 20 seconds of data, etc. The "sample window" can be configurable by users and/or administrators. In an embodiment, the sample window can be based on a quantity of data points, e.g., the sample window may be the most recent 500 frame rendering times received at the encoding decision module 218, or most recent 1000 frame rendering times, etc. The number can likewise be configurable by users or administrators.

The encoding decision module 218 can then analyze the data in the sample window to determine if the client rendering performance is insufficient. For example, an average of the frame rendering times in the sample window can be calculated and compared to a target frame rendering time. If the calculated average exceeds the target frame rendering time (e.g., 16.6 milliseconds for a 60 frame per second stream), then a determination can be made that the client device 204 rendering performance is insufficient and, in response, the encoding method can be modified. In this case, because an average is used, there may be times when the client 208 frame rendering time exceeds the target frame rendering time without causing a change to the encoding method.

In other embodiments, different techniques (e.g., smoothing techniques) than taking an average of render times can also be used for analyzing data in the sample window. For example, a predefined number or proportion of frame rendering times in a sample window can be allowed to exceed the target frame rendering time before any action is taken. For example, if the predefined number of allowable frames is two, then the encoding decision module 218 can determine that the client rendering performance is insufficient only after it finds more than two frame rendering times higher than the target rendering time in the sample window.

In various embodiments, the system can also be configured to detect when the client device rendering speed is fast (e.g., faster than a predefined threshold) and modify the encoding method in a way deemed preferable for improving rendering quality (e.g., image/video quality), which may be more demanding of resources on the client device 204. For example, after the target rendering rate is determined, the decision module 218 can assess whether the client device rendering performance is faster than the target rendering rate by a threshold difference. For example, if the client can render frames faster than the threshold target rendering time by a threshold amount (e.g., if frame rendering times received from the client 208 are below the target rendering time by a predetermined threshold amount), then a determination may be made (by the decision module 218) to modify the encoding method in a way deemed to improve image/video quality on the client device (e.g., which may make the decoding process more demanding of resources on the client device 204). Hence, when the encoding decision module 218 receives frame rendering times from the client 208, it can compare the frame rendering times with the target frame rendering time. Then, if a received frame rendering time is below the target rendering time by a threshold amount, the encoding decision module 218 can determine that the client rendering performance is more than sufficient and trigger an encoding method modification.

It should be noted that the system illustrated in FIG. 2 is provided only by way of example and alternative architectures are feasible without straying from the spirit of the invention. For example, in an embodiment, the encoding decision module may be located on the client device instead of the server (e.g., It may also be part of the client). In this case, the rendering times can be conveyed from the rendering timer directly to the encoding decision module on the client and the encoding decision module can make the determination of whether the client rendering performance is sufficient or insufficient. If the client rendering performance is determined to be insufficient, then the client can send a message to the agent on the server requesting it to modify the encoding method in a way deemed preferable for improving the client device rendering performance. In response to the message, the agent can then change the encoding method on the server to a method that is deemed preferable for improving the client device rendering performance.

FIG. 3 illustrates an example process flow for optimizing client performance for screen data streaming, in accordance with various embodiments. The process can begin in operation 302 where an agent can encode screen data using an encoding method and convey the encoded screen data to a client. For example, in a VDI environment, the agent can be a virtual desktop agent in a virtual desktop executing on a server and the client can be a virtual desktop client running on a client device. In the VDI case, the encoded screen data sent by the agent to the client can convey the GUI of the virtual desktop. The example process of FIG. 3 can likewise be utilized in environments other than VDI for conveying different types of screen data from an agent to a client.

In operation 304, the client can render frames of the received screen data and calculate frame rendering times. For example, to calculate the rendering time for each rendered frame, the client can measure the amount of time that was spent to render the frame. In operation 306, the frame rendering times can be conveyed to the agent. In operation 308 the agent can analyze the frame rendering times to determine if the client frame rendering performance is insufficient. As described above, the agent can implement various techniques for determining if the client rendering performance is insufficient, which techniques can be based on a comparison with a target rendering time (which can be based on the screen data frame rate or monitor refresh rate) and utilize certain techniques for smoothing data such as averaging frame rendering times in a moving sample window.

In operation 310, a decision can be made (e.g., by the agent) of whether the client's performance is insufficient based on the analysis performed in operation 308. If the client's performance is not determined to be insufficient, then the process can return to operation 302, where the screen data can continue to be encoded using the same encoding method and conveyed to the client. If, in operation 310, client performance is determined to be insufficient, then the process can proceed to operation 312, where the encoding method used to encode the screen data can be modified in ways deemed preferable for improving client rendering performance. The process can then return to operation 302, where the screen data can be encoded, now using the modified encoding method, and conveyed to the client.

Figure 4:
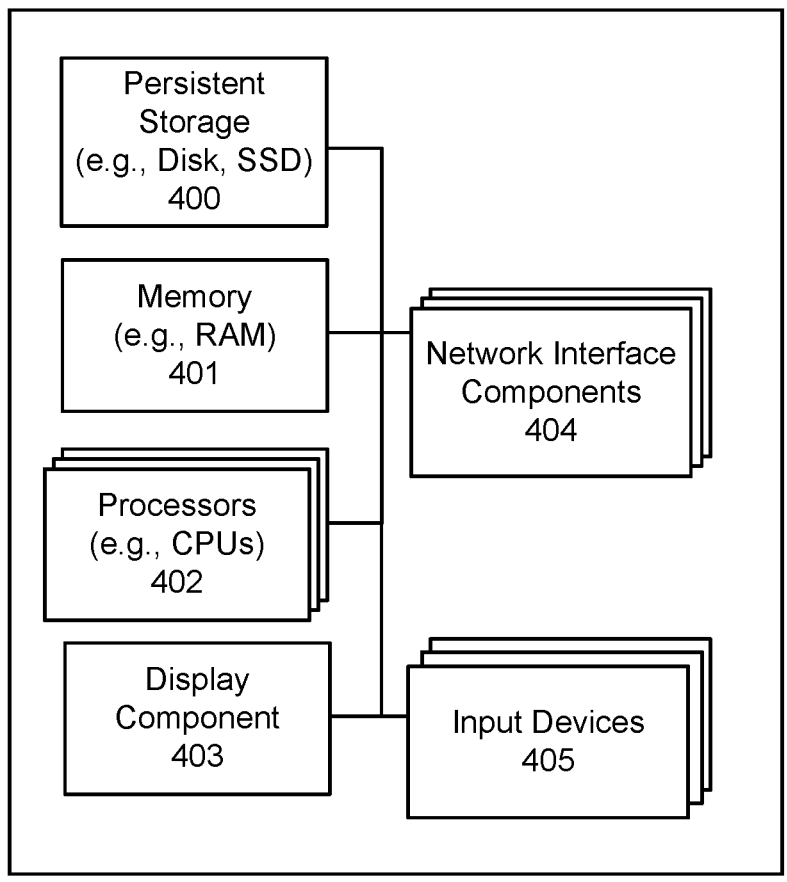
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi®, Bluetooth®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method for streaming screen data from a server to a client device, comprising:
   on the server, encoding the screen data using an encoding method;
   conveying the encoded screen data to the client device;
   on the client device, decoding the encoded screen data using a decoding process and rendering frames of the screen data using a rendering process;
   measuring, for the frames, periods each being between a start time when the decoding process for a respective frame begins and a finish time when the rendering process for a respective frame ends;
   sending the periods as measured from the client device to the server; and
   modifying, based on the periods as measured by the client device, the encoding method used to encode the screen data on the server by modifying one or more parameters of the encoding method or by switching to a different encoding method.

2. The method of claim 1, wherein the server performs the step of modifying in response to determining that performance of the client device is insufficient based on a target frame rendering time.

3. The method of claim 1, wherein the server performs the step of modifying in response to determining that performance of the client device is insufficient based on a comparison of an average of the periods for the frames in a predefined sample window to a target frame rendering time.

4. The method of claim 1, wherein the server performs the step of modifying in response to determining that performance of the client device is insufficient based on a target frame rendering time, and the target frame rendering time is determined based on one of: a frame rate corresponding to the screen data or a refresh rate of a monitor of the client device.

5. The method of claim 1, wherein:
   the encoded screen data comprises a graphical user interface (GUI) of a virtual desktop running on the server;
   the encoded screen data comprising the virtual desktop GUI is conveyed by a virtual desktop agent to a virtual desktop client on the client device, the virtual desktop client being configured to display the GUI to a user of the client device and to convey user inputs targeting the virtual desktop made on the client device to the virtual desktop agent to be effectuated in the virtual desktop;
   the virtual desktop client determines the periods for the frames and conveys the periods to the virtual desktop agent in the virtual desktop; and
   the virtual desktop agent modifies the encoding method based on the periods.

6. A computing system for streaming screen data from a server to a client device, comprising:

at least one processor; and memory including instructions that, when executed by the at least one processor, cause the computing device to perform the steps of:

on the server, encoding the screen data using an encoding method;

conveying the encoded screen data to the client device;

on the client device, decoding the encoded screen data using a decoding process and rendering frames of the screen data using a rendering process;

measuring, for the frames, periods each being between a start time when the decoding process for a respective frame begins and a finish time when the rendering process for a respective frame ends;

sending the periods as measured from the client device to the server; and modifying, based on the periods as measured by the client device, the encoding method used to encode the screen data on the server by modifying one or more parameters of the encoding method or by switching to a different encoding method.

7. The computing system of claim 6, wherein the server performs the step of modifying in response to determining that performance of the client device is insufficient based on a target frame rendering time.

8. The computing system of claim 6, wherein the server performs the step of modifying in response to determining that performance of the client device is insufficient based on a comparison of an average of the periods for the frames in a predefined sample window to a target frame rendering time.

9. The computing system of claim 6, wherein the server performs the step of modifying in response to determining that performance of the client device is insufficient based on a target frame rendering time, and the target frame rendering time is determined based on one of: a frame rate corresponding to the screen data or a refresh rate of a monitor of the client device.

10. The computing system of claim 6, wherein:

the encoded screen data comprises a graphical user interface (GUI) of a virtual desktop running on the server;

the encoded screen data comprising the virtual desktop GUI is conveyed by a virtual desktop agent to a virtual desktop client on the client device, the virtual desktop client being configured to display the GUI to a user of the client device and to convey user inputs targeting the virtual desktop made on the client device to the virtual desktop agent to be effectuated in the virtual desktop;

the virtual desktop client determines the periods for the frames and conveys the periods to the virtual desktop agent in the virtual desktop; and the virtual desktop agent modifies the encoding method based on the periods.

11. A non-transitory computer readable storage medium for streaming screen data from a server to a client device comprising one or more sequences of instructions, the instructions when executed by one or more processors causing the one or more processors to execute the operations of:

on the server, encoding the screen data using an encoding method;

conveying the encoded screen data to the client device;

on the client device, decoding the encoded screen data using a decoding process and rendering frames of the screen data using a rendering process;

measuring, for the frames, periods each being between a start time when the decoding process for a respective frame begins and a finish time when the rendering process for a respective frame ends;

sending the periods as measured from the client device to the server; and modifying, based on the periods as measured by the client device, the encoding method used to encode the screen data on the server by modifying one or more parameters of the encoding method or by switching to a different encoding method.

12. The non-transitory computer readable storage medium of claim 11, wherein the server performs the step of modifying in response to determining that performance of the client device is insufficient based on a target frame rendering time.

13. The non-transitory computer readable storage medium of claim 11, wherein the server performs the step of modifying in response to determining that performance of the client device is insufficient based on a comparison of an average of the periods for the frames in a predefined sample window to a target frame rendering time.

14. The non-transitory computer readable storage medium of claim 11, wherein the server performs the step of modifying in response to determining that performance of the client device is insufficient based on a target frame rendering time, and the target frame rendering time is determined based on one of: a frame rate corresponding to the screen data or a refresh rate of a monitor of the client device.

15. The non-transitory computer readable storage medium of claim 11, wherein:

the encoded screen data comprises a graphical user interface (GUI) of a virtual desktop running on the server;

the encoded screen data comprising the virtual desktop GUI is conveyed by a virtual desktop agent to a virtual desktop client on the client device, the virtual desktop client being configured to display the GUI to a user of the client device and to convey user inputs targeting the virtual desktop made on the client device to the virtual desktop agent to be effectuated in the virtual desktop;

the virtual desktop client determines the periods for the frames and conveys the periods to the virtual desktop agent in the virtual desktop; and the virtual desktop agent modifies the encoding method based on the periods.

\* \* \* \* \*